(12) United States Patent
Tseng

(10) Patent No.: US 10,227,035 B2
(45) Date of Patent: Mar. 12, 2019

(54) TAIL LAMP ASSEMBLY FOR A VEHICLE

(71) Applicant: Chiung-Yu Tseng, Tainan (TW)

(72) Inventor: Chiung-Yu Tseng, Tainan (TW)

( * ) Notice: Subject to any disclaimer, the term of this patent is extended or adjusted under 35 U.S.C. 154(b) by 51 days.

(21) Appl. No.: 15/144,784

(22) Filed: May 2, 2016

(65) Prior Publication Data

US 2016/0332561 A1    Nov. 17, 2016

(30) Foreign Application Priority Data

May 12, 2015  (TW) .............................. 104114965 A
Mar. 14, 2016  (TW) .............................. 105107819 A

(51) Int. Cl.
| | |
|---|---|
| *B60Q 1/26* | (2006.01) |
| *B60Q 1/30* | (2006.01) |
| *B60Q 1/00* | (2006.01) |
| *B62D 33/027* | (2006.01) |

(52) U.S. Cl.
CPC ............ *B60Q 1/30* (2013.01); *B60Q 1/0035* (2013.01); *B60Q 1/0041* (2013.01); *B60Q 1/0088* (2013.01); *B60Q 1/2607* (2013.01); *B60Q 1/2669* (2013.01); *B60Q 2900/10* (2013.01); *B62D 33/0273* (2013.01)

(58) Field of Classification Search
CPC ...................................................... F21S 48/20
USPC .......................................................... 362/499
See application file for complete search history.

(56) References Cited

U.S. PATENT DOCUMENTS

| | | | | |
|---|---|---|---|---|
| 2,107,570 | A * | 2/1938 | Hobbs | F21V 23/0492 |
| | | | | 200/61.83 |
| 7,357,435 | B2 * | 4/2008 | Robertson | B60R 25/1001 |
| | | | | 296/146.4 |
| 8,552,852 | B1 | 10/2013 | Hertz | |
| 8,854,201 | B1 * | 10/2014 | Hertz | B60P 3/40 |
| | | | | 340/468 |
| 9,328,891 | B1 * | 5/2016 | Dernar | B60Q 1/2607 |
| 2006/0186685 | A1 | 8/2006 | Nagle | |
| 2007/0262602 | A1 * | 11/2007 | Nagle | B60P 3/07 |
| | | | | 296/51 |
| 2012/0075875 | A1 * | 3/2012 | Son | B60Q 1/50 |
| | | | | 362/487 |

(Continued)

FOREIGN PATENT DOCUMENTS

| | | |
|---|---|---|
| CN | 202016428 U | 10/2011 |
| CN | 202320071 U | 7/2012 |
| FR | 2 990 905 A3 | 11/2013 |

(Continued)

*Primary Examiner* — Sean P Gramling
*Assistant Examiner* — Keith G. Delahoussaye
(74) *Attorney, Agent, or Firm* — Winston Hsu

(57) ABSTRACT

A tail lamp assembly is provided to include a tail lamp and a tailgate lamp. The tail lamp assembly replaces the original taillights of a vehicle with the tail lamp, which is embedded in the rear side plate of the vehicle, whereas the tailgate lamp is attached to the tailgate of the vehicle. The tail lamp is directly controlled by the vehicle to selectively provide specific warning signals. The tailgate lamp is disposed on a surface of the tailgate, extending from the tail lamp at the position within a certain distance from the tail lamp. A light channel or electric channel is selectively established between the tail lamp and the tailgate lamp to link and synchronize the tailgate lamp with the tail lamp, so that the tailgate lamp provides specific warning signals accordingly.

22 Claims, 9 Drawing Sheets

(56) References Cited

U.S. PATENT DOCUMENTS

2014/0333428 A1\* 11/2014 Markell ................ B60Q 1/26
340/475
2015/0375804 A1\* 12/2015 Gray ................ B62D 33/0273
296/186.3

FOREIGN PATENT DOCUMENTS

| FR | 2990905 A3 \* | 11/2013 | ............ B60Q 1/30 |
| JP | WO 2012077379 A1 \* | 6/2012 | ............ B60Q 1/30 |
| KR | 10-2010-0084462 A | 7/2010 | |
| TW | M315674 | 7/2007 | |
| TW | M336889 | 7/2008 | |
| TW | M479237 U | 6/2014 | |
| TW | M494099 U | 1/2015 | |

\* cited by examiner

TAIL LAMP ASSEMBLY FOR A VEHICLE

BACKGROUND OF THE INVENTION

1. Field of the Invention

The invention relates to an accessory for vehicles, and more particularly, to an expanded tail lamp assembly for aftermarket of car industry.

2. Description of the Prior Art

Pickup trucks in the market usually refer to light trucks with open carrier that have the features of light weight, capability for loading goods and personnel at the same time, and tougher carrying capacity than ordinary vehicles, and are picked as the mainstream type in car market in some countries. Such type of vehicles are also extensively used in countries with severe environment.

Generally, a pickup truck may be divided into three sections as the engine room, the driver room, and the loading space. The cargo compartment of a pickup truck behind the driver room is provided as an open and uncovered loading space formed and surrounded by two side plates, a tailgate, and a base plate of the pickup truck, where the tailgate is pivoted to the base plate to be rotatable with respect to the base plate to open or close. Loading/unloading of goods can be done when the tailgate is pivoted to open and after that, the tailgate should be rotated to close with respect to the side plates to a closed position and locked to the side plates via bolts or chains so that the goods in the cargo compartment may not fall off during transportation.

On account to the special structure of the pickup trucks, the taillights at the rear end of the vehicles are generally designed to be placed at the end of the side plates of the cargo compartment, leaving the tailgate as simply a structural entity with no power or control wiring. Therefore, the flexibility of designing the taillights and the ability to signaling or warning are limited.

Besides pickup trucks as discussed, vehicles in other types such as sedans, vans, SUVs (Sport Utility Van), wagons, cross country vehicles, and all possible types of vehicles unlisted, are more or less restricted in designing the taillights. One set of lamp at the tailgate of the vehicle is always independent from another set of lamp at the rear side plate, with dedicated wiring and control signals by the lamp controller. In such way, complex lamp controller is needed to have separate control over the two sets of lamp at the rear side plate and at the tailgate respectively, which increases challenge in designing the lamp controller.

SUMMARY OF THE INVENTION

It is therefore an objective for the invention to provide a tail lamp assembly configured to be used for a vehicle to break through the current limitation.

An embodiment of the invention provides a tail lamp assembly for a vehicle. The vehicle has two side plates and a tailgate, which is configurable at an opened position or a closed position with respect to the two side plates. The tail lamp assembly includes a tail lamp and a tailgate lamp. The tail lamp is embedded in one of the side plates and includes a first lamp set and a signal module. The first lamp set is controlled by the vehicle to selectively provide at least one warning signal. The signal module is controlled by the vehicle to generate at least one control signal. The tailgate lamp is attached to the tailgate, the tailgate lamp is adjacent to the tail lamp when the tailgate is configured at the closed position. The tailgate lamp is adapted to receiving the at least one control signal through a signal channel, so as to link with the tail lamp and provide at least one warning signal.

Another embodiment of the invention provides a tail lamp assembly for a pickup truck. The pickup truck has an open and uncovered loading space formed and surrounded by two side plates, a tailgate, and a base plate of the pickup truck. The tailgate is pivoted to the base plate and is configurable at an opened position or a closed position with respect to the two side plates. The tail lamp assembly includes a tail lamp and a tailgate lamp. The tail lamp is embedded in one of the side plates and includes a first lamp set and a signal module. The first lamp set is controlled by the pickup truck to selectively provide at least one warning signal. The signal module is controlled by the pickup truck to generate at least one control signal in accordance with the warning signal. The tailgate lamp is attached to the tailgate. The tailgate lamp is adjacent to the tail lamp when the tailgate is configured at the closed position. The tailgate lamp is adapted to receiving the at least one control signal through a signal channel, so as to link and synchronize with the tail lamp and provide at least one warning signal correspondingly.

According to the embodiments of the invention, the tailgate lamp is attached to a plain surface of the tailgate via adhering or bolting.

According to the embodiments of the invention, the tailgate lamp stops receiving the at least one control signal through the signal channel when the tailgate is configured at the opened position.

According to the embodiments of the invention, the signal module is a light provider and the tailgate lamp includes a receiving module being a light receiver, which is adapted to receiving the at least one control signal generated by the specific light provider through the signal channel, so as to provide the at least one warning signal correspondingly.

According to the embodiments of the invention, the tailgate lamp includes a second lamp set. The at least one control signal generated by the light provider has lights at different locations and the second lamp set is adapted to receiving the lights at different locations from the light receiver and reflecting to provide corresponding warning signals at corresponding locations.

According to the embodiments of the invention, the light provider and the light receiver cooperatively form in the shape of a hand grip on the pickup truck.

According to the embodiments of the invention, the tailgate lamp includes a receiving module and a second lamp set. The receiving module is made adjacent to the signal module and the signal channel and/or a power channel is established between the signal module and the receiving module when the tailgate is configured at the closed position.

According to the embodiments of the invention, the receiving module is adapted to receiving the at least one control signal through the signal channel and the second lamp set is adapted to providing the corresponding at least one warning signal.

According to the embodiment of the invention, the tail lamp includes a solenoid valve controlled and activated by the pickup truck to establish the signal channel and/or the power channel between the signal module and the receiving module when the tailgate is configured at the closed position.

According to the embodiments of the invention, the signal channel and/or the power channel is established by the signal module magnetically coupled to the receiving module when the tailgate is configured at the closed position.

According to the embodiments of the invention, the signal module includes a plurality of signal receptors and the receiving module includes a plurality of signal pins, which corresponds to the plurality of signal receptors respectively. When the tailgate is configured at the closed position, the plurality of signal pins inserts to the corresponding plurality of signal receptors so that the signal channel and/or the power channel is established.

According to the embodiments of the invention, the signal module and the receiving module cooperatively form in the shape of a hand grip on the pickup truck.

According to the embodiments of the invention, the tailgate lamp is adjacent to the tail lamp and the tailgate lamp together with the tail lamp form a shape with continuous contour.

According to the embodiments of the invention, the first lamp set includes at least one of an indicator, a warning light, and a stop light, and the tailgate lamp includes at least one of an indicator, a warning light, and a stop light.

The tail lamp assembly provided in the embodiments of the invention is applicable to all types of vehicles (and pickup trucks) currently available in the market. It enriches the design of the taillights on any vehicle, further by extending the taillights to the tailgate. The direct adhesion or bolting of the tailgate lamp to the tailgate saves unnecessary work of manufacturing the tailgate or disposing extra wiring therein, providing a solution of remodeling after the vehicle leaves the factory. Meanwhile, cost for configuration of light controllers and wirings can be further saved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct mechanical connection. Thus, if a first device is coupled to a second device, that connection may be through a direct mechanical connection, or through an indirect mechanical connection via other devices and connections.

Figure 1:
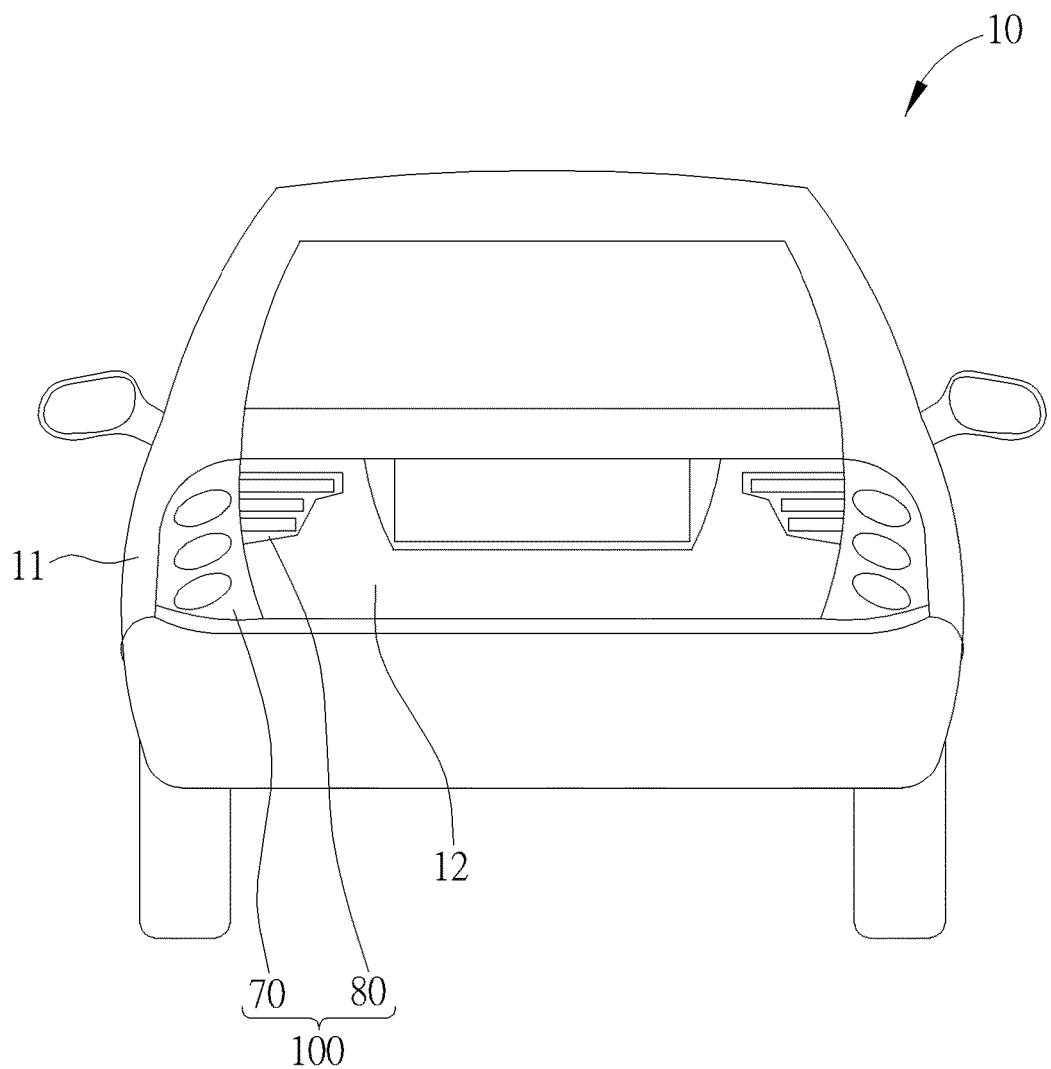
FIG. 1 is a schematic diagram of a rear part of a vehicle with the tailgate configured at a closed position.

Please refer to FIG. 1. FIG. 1 is a schematic diagram of a rear part of a vehicle with the tailgate configured at a closed position. The vehicle 10 in FIG. 1 can be a sedan, a van, an SUV (Sport Utility Van), a wagon, across country vehicle, an open carrier truck, a closed carrier truck, a pickup truck, or all possible types of vehicle unlisted. The vehicle 10 has two side plates 11 at the rear part of the vehicle 10 and a moveable tailgate 12 located between the two side plates 11. The tailgate 12 can be selectively closed with respect to the two side plates 11 and configured at a closed position as shown in FIG. 1, or be selectively opened with respect to the two side plate 11 and configured at an opened position. A tail lamp assembly 100 according to the invention includes a tail lamp 70 and a tailgate lamp 80. The tail lamp 70 is embedded in the side plate 11, whereas the tailgate lamp 80 is attached to the tailgate 12.

Figure 2:
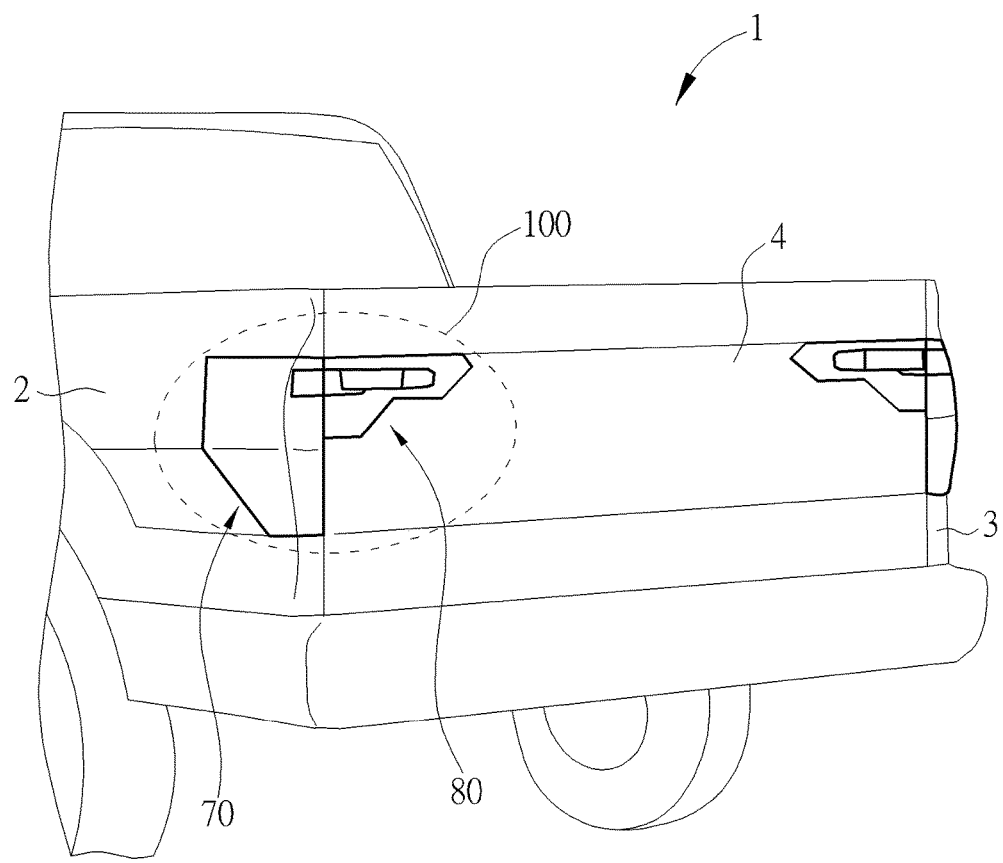
FIG. 2 is a schematic diagram of a rear part of a pickup truck with the tailgate configured at a closed position.
Figure 3:
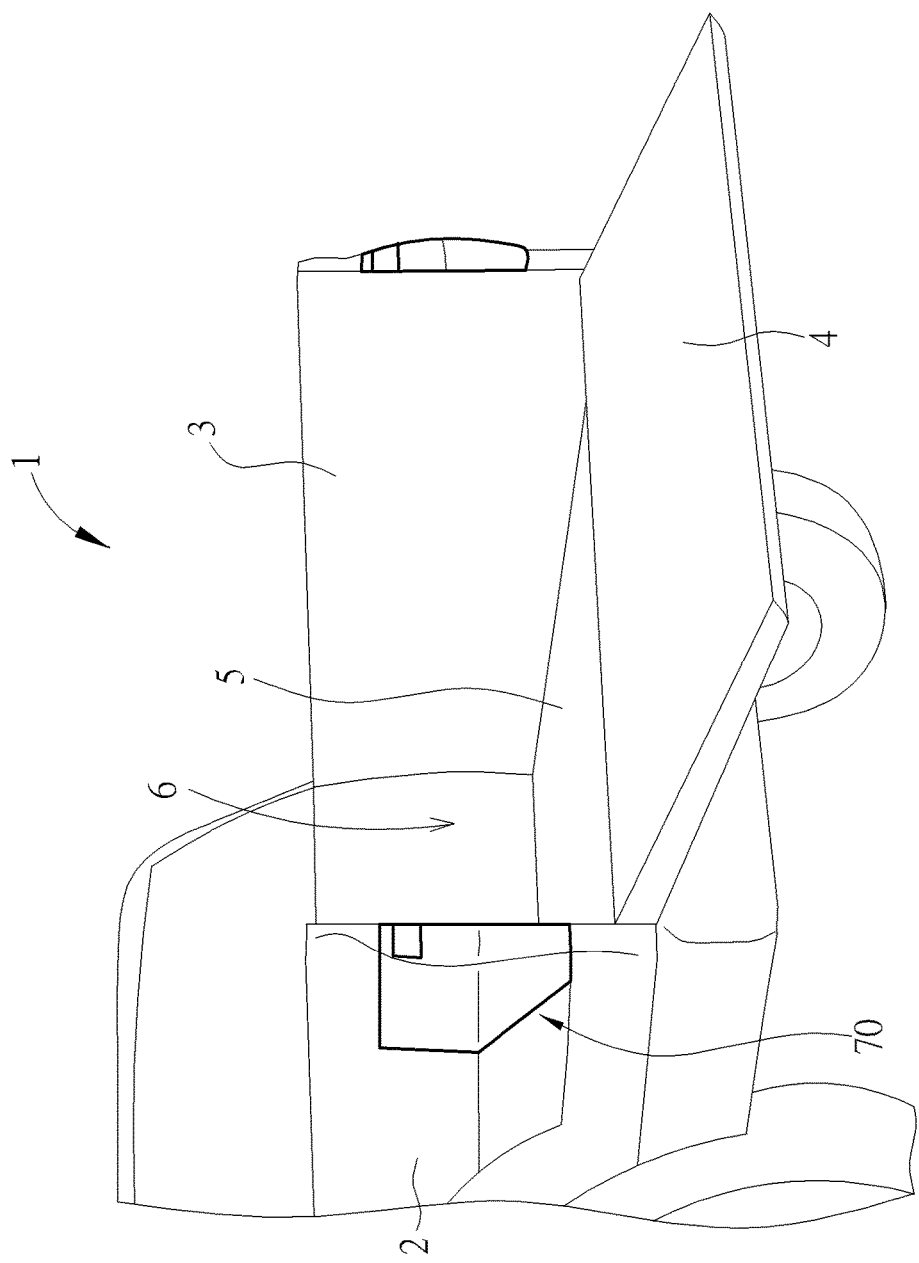
FIG. 3 is a schematic diagram of the rear part of the pickup truck with the tailgate configured at an opened position.

Please refer to FIG. 2 and FIG. 3. FIG. 2 is a schematic diagram of a rear part of a pickup truck with the tailgate configured at a closed position and FIG. 3 is a schematic diagram of the rear part of the pickup truck with the tailgate configured at an opened position. The tail lamp assembly 100 mounted to the pickup truck 1 is used as an embodiment for describing the invention, and it should be noted that the tail lamp assembly 100 is also applicable on vehicles of other types in the same way, for example, the vehicle 10 in the form of a sedan as depicted in FIG. 1 or other types of vehicles, although not illustrated, such as a van, an SUV (Sport Utility Van), a wagon, a cross country vehicle, an open carrier truck, or a closed carrier truck. The exemplary embodiments should not be regarded as a limit to the invention. For those vehicles or transportation carriers that have side plates, at which wiring for lights and mounting structures are located, and a tailgate moveable with respect to the side plates are within the range of application of the invention. The cargo compartment at the back of a pickup truck 1 is provided as an open and uncovered loading space 6 formed and surrounded by two side plates 2, 3, a tailgate 4 at the rear end, and a base plate 5 at the bottom of the pickup truck 1. The tailgate 4 is pivoted to the base plate 5 and can be rotate with respect to the base plate 5 to open or to close. In FIG. 3, the tailgate 4 is opened to the opened position with respect to the two side plates 2, 3, and when the tailgate 4 is folded upward to close with respect to the side plates 2, 3 to the closed position as shown in FIG. 2, and is further locked to the side plates 2, 3, the goods (not shown) in the cargo compartment may not fall off during transportation.

The tail lamp assembly 100 according to the invention is designed to be disposed at the rear end of the vehicle, more specifically, to replace the original taillights of the pickup truck 1 and have the extensibility to the tailgate 4. The tail lamp assembly 100 includes a tail lamp 70 and a tailgate lamp 80, where in the embodiment as shown in the figures, the pickup truck 1 has two sets of tail lamp assemblies 100, the tail lamps 70 of the tail lamp assemblies 100 embedded in the side plates 2, 3 respectively and the tailgate lamps 80 attached to the tailgate 4.

Figure 4:
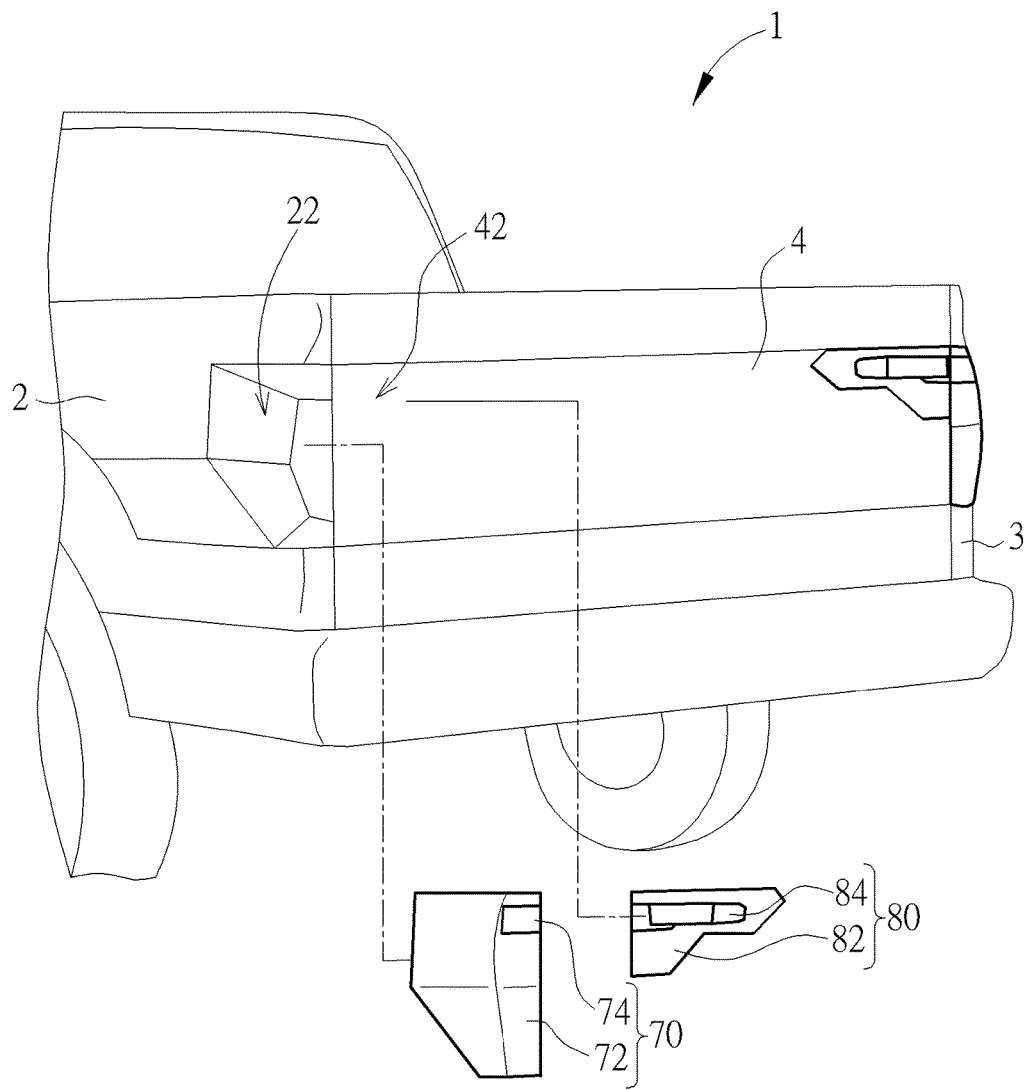
FIG. 4 is a schematic diagram of how the tail lamp assembly of the invention is assembled to rear end of the pickup truck.

Please refer to FIG. 4, which is a schematic diagram of how the tail lamp assembly 100 of the invention is assembled to rear end of the pickup truck 1. The tail lamp 70 of the tail lamp assembly 100 replaces the original taillights of the pickup truck 1 so as to be embedded in the side plate 2 and share the indentation 22 and wiring originally designed for the original taillights. The tailgate lamp 80 is otherwise attached to a plain surface 42 of the tailgate 4 via adhering or bolting. In other words, for the aftermarket of cars, any pickup truck 1 (or any type of vehicle as described above) can be remodeled to extend the use of the tail lamp assembly by replacing the original taillights with the tail lamp 70 of the invention and further attaching the tailgate lamp 80 to the tailgate 4.

Please keep referring to FIG. 4. The tail lamp 70 includes a first lamp set 72 and a signal module 74. The first lamp set 72 is assembled to the car body through the indentation 22 and wiring therein and can be controlled by the pickup truck 1 to selectively provide at least one warning signal. For example, the first lamp set 72 may include at least one of an indicator, a warning light, a stop light, and lights with other possible use, whereas the pickup truck 1 may control the first lamp set 72 to selectively turn on any one of the above lights and provide corresponding warning signal. The tailgate lamp 80 includes a second lamp set 82 and a receiving module 84 and when the tailgate 4 is configured at the closed position as shown in FIG. 2, the tailgate lamp 80 is adjacent to the tail lamp 70 and the tailgate lamp 80 together with the tail lamp 70 form a shape with continuous contour. More specifically, since the tailgate lamp 80 of the invention is attached to the plain surface 42 of the tailgate 4, the tailgate lamp 80 will protrude on the tailgate 4 in more extent than the original taillights that is embedded in the side plate 2 and after the tail lamp 70 of the invention replaces the original taillights and is assembled in the indentation 22 of the side plate 2, the tail lamp 70 of the invention protrudes from the side plate 2 in substantially equal extent as the tailgate lamp 80, so that both the tail lamp 70 and the tailgate lamp 80 may be cooperatively continuous in shape. Additionally, the signal module 74 of the tail lamp 70 and the receiving module 84 of the tailgate lamp 80 preferably form in the shape of a hand grip on the pickup truck 1 cooperatively. The second lamp set 82 of the tailgate lamp 80 may also include at least one of an indicator, a warning light, a stop light, and lights with other possible use that corresponds to the first lamp set 72, and in such way, the warning signals of the tail lamp assembly 100 may be extended from the side plate 2 and/or side plate 3 to the tailgate 4. In other embodiment of the invention, the indicator, the warning light, and the stop light may also be separately configured to be disposed at the first lamp set 72 and the second lamp set 82 without the need to have any one light at both lamp sets. For example, the first lamp set 72 may include the indicator and the warning light while the second lamp set 82 may include the stop light and the extending warning light corresponding to the first lamp set 72. However, the invention is not limited to what is described in the embodiment.

Figure 5:
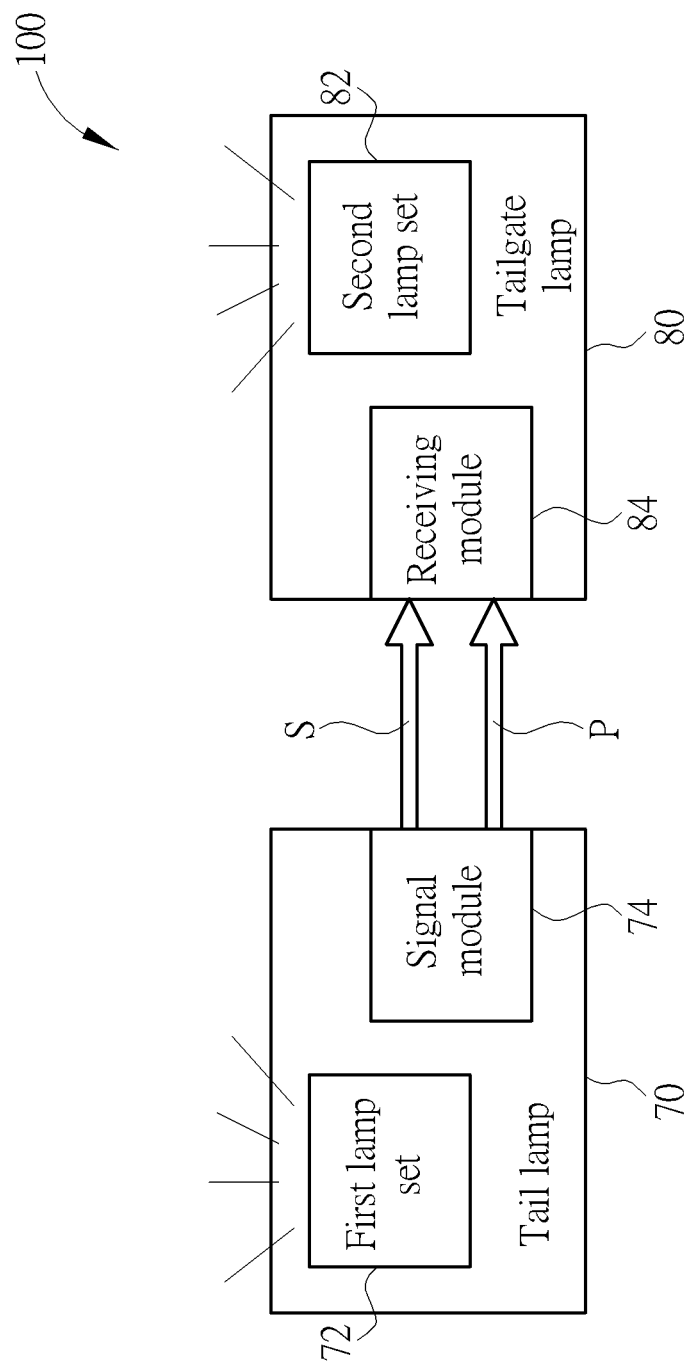
FIG. 5 is a schematic diagram of a functional block view of the tail lamp assembly according to the invention.

Please refer to FIG. 5. FIG. 5 is a schematic diagram of a functional block view of the tail lamp assembly according to the invention. As described, when the tailgate 4 is configured at the closed position as shown in FIG. 2, the tailgate lamp 80 is adjacent to the tail lamp 70 and the signal module 74 of the tail lamp 70, according to the control from the pickup truck 1, thus generates control signals in accordance with the warning signals, the indicator, the warning light, and the stop light, of the first lamp set 72, for example, the control signal of the indicator, the control signal of the warning light, and/or the control signal of the stop light. The at least one or more control signals are then transmitted to the adjacent receiving module 84 through a signal channel S and on receiving the control signals, the tailgate lamp 80 links and synchronizes with the tail lamp 70 and provides at least one warning signal, the indicator, the warning light, and/or the stop light, correspondingly. The tailgate lamp 80 will stop receiving the at least one control signal through the signal channel S when the tailgate 4 is opened from the closed position with respect to the side plates 2, 3 to the opened position as shown in FIG. 3, i.e., the tailgate lamp 80 is controlled directly by the tail lamp 70 and can be activated and controlled by the tail lamp 70 when the tailgate 4 is at the closed position.

Figure 6:
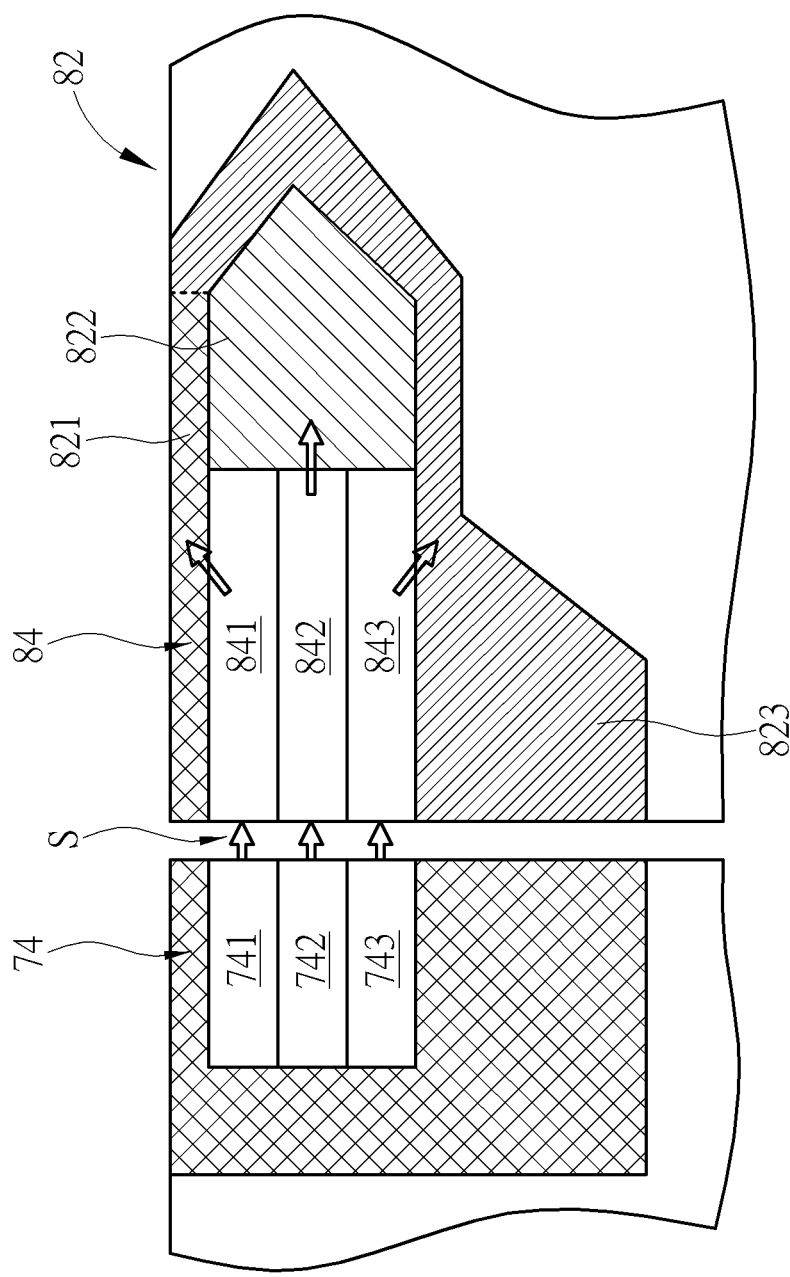
FIG. 6 is a schematic diagram of a first embodiment of the signal module and the receiving module according to the invention.

Several embodiments are provided here to demonstrate how the tail lamp assembly 100 of the invention can be implemented on a pickup truck to show the control of the tailgate lamp 80 providing corresponding warning signals given the structure described above. In one embodiment for example, the signal module of the tail lamp 70 can be a light provider and the receiving module 84 of the tailgate lamp 80 can be a light receiver. As described earlier, the light provider and the light receiver cooperatively form in the shape of a hand grip on the pickup truck 1. Please refer to FIG. 6, which is a schematic diagram of a first embodiment of the signal module and the receiving module according to the invention. The signal module 74 generates the at least one control signal in the form of directly providing lights and projecting the lights toward the receiving module 84. In other words, the receiving module 84 (or the tailgate lamp 80) receives the lights from a specific light source, the tail lamp 70, and the receiving module 84 provides the at least one warning signal correspondingly, in which the signal channel S aforementioned is the path the lights are conveyed. To be more specifically, the signal module 74, the light provider, of the embodiment in FIG. 6 includes a first light source 741, a second light source 742, and a third light source 743, which emit lights from different locations. The receiving module 84, the light receiver, includes a first receiver 841, a second receiver 842, and a third receiver 843, which correspond to the locations of the first light source 741, the second light source 742, and the third light source 743 respectively. The first receiver 841 guides the lights to a first warning lamp 821 of the second lamp set 82, the second receiver 842 guides the lights to a second warning lamp 822 of the second lamp set 82, and the third receiver 843 guides the lights to a third warning lamp 823 of the second lamp set 82. The first warning lamp 821, the second warning lamp 822, and the third warning lamp 823 each have its own color and shape cooperative with the first lamp set, which is not shown in FIG. 5, and present warning signals functioning in different purposes. When the tail lamp 70 is controlled by the pickup truck 1 and a warning signal such as an indicator is provided, the signal module 74 also generates a control signal in accordance with the warning signal according to the control of the pickup truck 1. For example, the control signal is the lights generated by the first light source 741, which is then received by the first receiver 841 and reflected out by the first warning lamp 821 to be recognized as the corresponding warning signal on the second lamp set 82, which in this case is also an indicator. The second and the third warning signals from the tail lamp 70 and the way how the tailgate lamp 80 is activated to provide corresponding warning signals are similar as the case of the first warning signal and the description is herein omitted for brevity.

Figure 7:
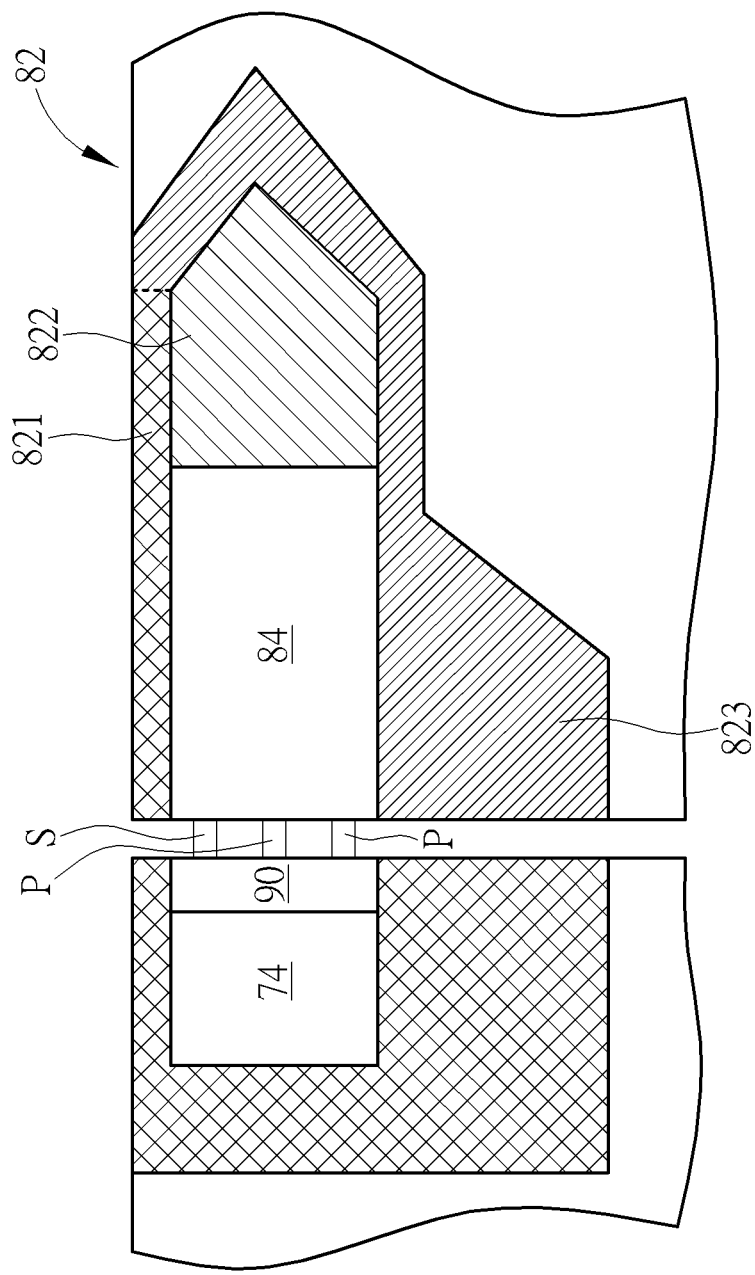
FIG. 7 is a schematic diagram of a second embodiment of the signal module and the receiving module according to the invention.

Please refer to FIG. 7, which is a schematic diagram of a second embodiment of the signal module and the receiving module according to the invention. Besides the direct light transmission way as described above, the invention also provides another embodiment that establishes a signal and/ or a power channel between the signal module 74 and the receiving module 84 and the second lamp set 82 is controlled by the receiving module 84 to illuminate actively. As shown in FIG. 7, the tail lamp 70 further include a solenoid valve 90 disposed at a location in the signal module 74 and adjacent to the receiving module 84. When the tailgate 4 is configured at the closed position as shown in FIG. 2, the pickup truck 1 is able to activate the solenoid valve 90 to connect directly between the signal module 74 and the receiving module 84 and utilizes its three connection pins between the signal module 74 and the receiving module 84 to establish the signal channel S and/or the power channel P. The receiving module 84 can be powered through the power channel P, receive the control signals through the signal channel S, and control the second lamp set 82, such as the first warning 821, the second warning lamp 822, or the third warning lamp 823, to provide the corresponding warning signals.

Besides the embodiment in FIG. 7 that uses the solenoid valve as the establishment of connection between the modules, by extending electrodes to connect to the hand-grip like receiving module 84, in a third embodiment of the signal module 74 and the receiving module 84, magnetic elements are disposed between the signal module 74 and the receiving module 84 and the signal channel S and/or the power channel P is established by the signal module 74 magnetically coupled to the receiving module 84. The receiving module 84, as the second embodiment above, can be powered through the power channel P, receive the control signals through the signal channel S, and control the second lamp set 82, such as the first warning 821, the second warning lamp 822, or the third warning lamp 823, to provide the corresponding warning signals.

Figure 8:
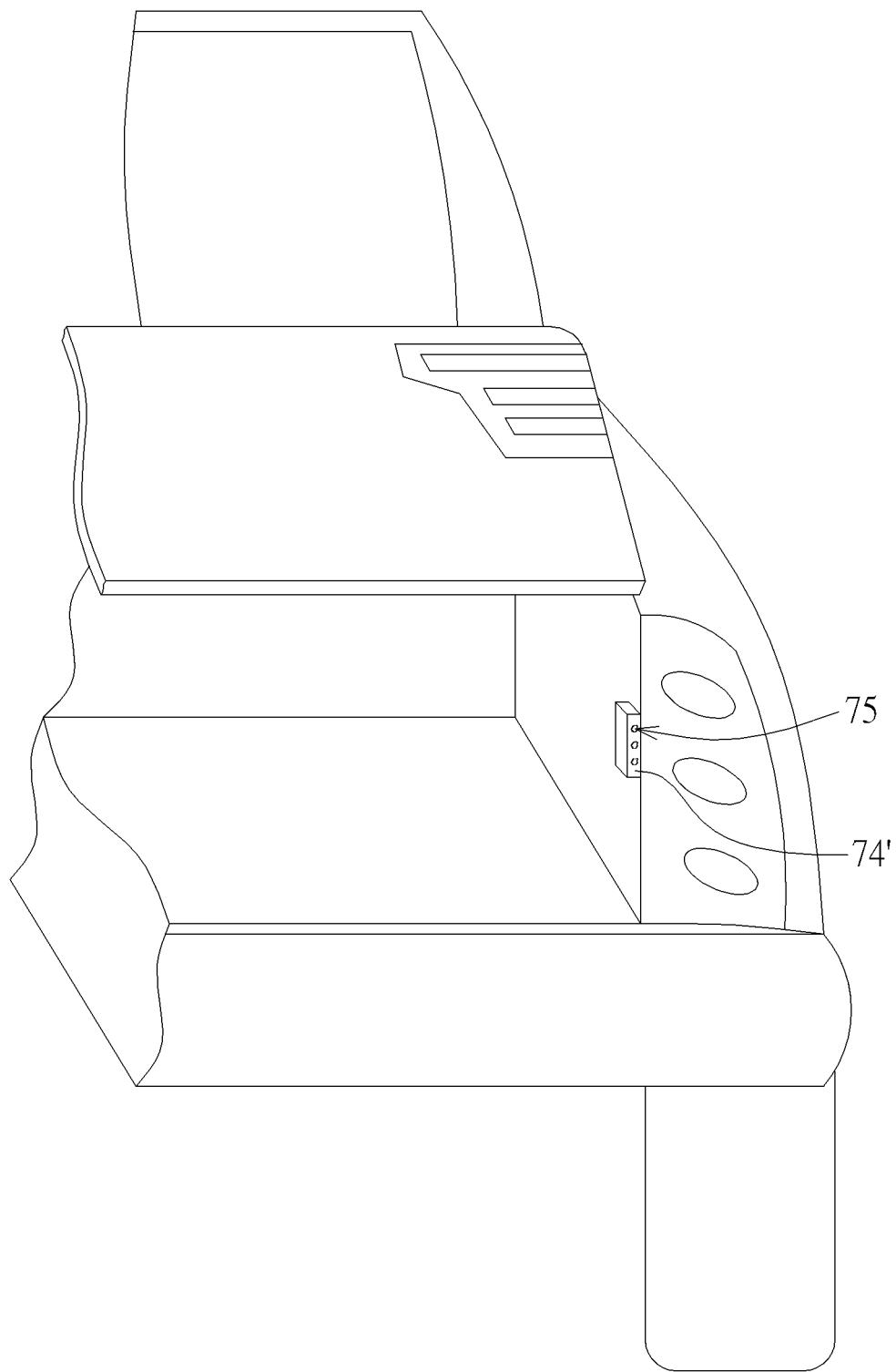
FIG. 8 is a schematic diagram of a third embodiment of the signal module according to the invention.
Figure 9:
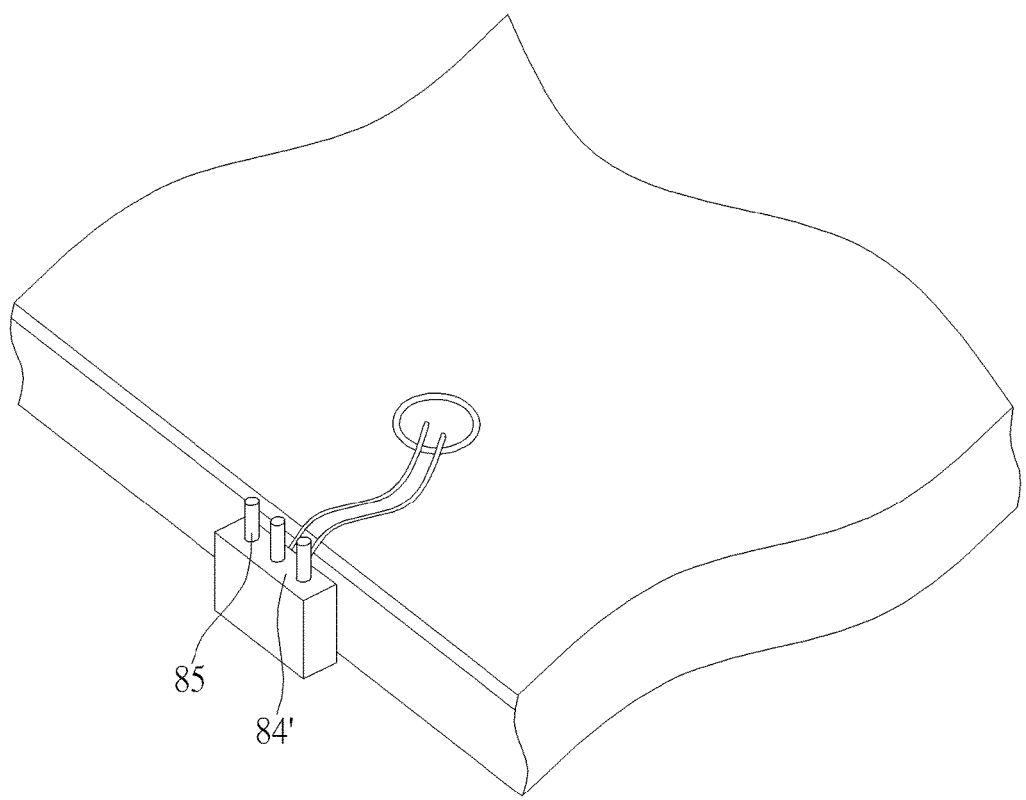
FIG. 9 is a schematic diagram of a third embodiment of the receiving module according to the invention.

Please refer to FIG. 8 and FIG. 9. FIG. 8 is a schematic diagram of a third embodiment of the signal module according to the invention and FIG. 9 is a schematic diagram of a third embodiment of the receiving module according to the invention. The third embodiment in FIG. 8 and FIG. 9 provides that a receiving module 84' and a signal module 74' establish physical connection of the signal channel S and/or the power channel P by mechanically coupling. More specifically, in a preferred embodiment according to the invention, the signal module 74' includes a plurality of signal receptors 75 and the receiving module 84' includes a plurality of corresponding signal pins 85 (or vice versa in another embodiment, the signal module 74' includes pins and the receiving module 84' includes receptors). When the tailgate where the receiving module 85' is located is closed to the closed position with respect to the side plates at two sides as shown in FIG. 1 or FIG. 2, the plurality of signal pins 85 of the receiving module 84' inserts directly to the corresponding plurality of signal receptors 75, so that the signal channel S and/or the power channel P may be established.

The tail lamp assembly provided in the invention includes the tail lamp and the tailgate lamp. The tail lamp assembly replaces the original taillights of the vehicle with the tail lamp, which is embedded in the side plate of the vehicle, whereas the tailgate lamp is attached to the tailgate of the vehicle. The tail lamp is directly controlled by the vehicle to selectively provide specific warning signals. The tailgate lamp is disposed on the plain surface of the tailgate, extending from the tail lamp at the position within a certain distance from the tail lamp. A light channel or electric channel is selectively established between the tail lamp and the tailgate lamp, with lights, solenoid valve, or magnetic attraction, to link and synchronize the tailgate lamp with the tail lamp, so that the tailgate lamp provides specific warning signals accordingly. No further work of manufacturing the tailgate or disposing extra wiring therein is needed and the vehicles can be remodeled with a variety of options of tail lamp designs, including extending the taillights to the tailgate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tail lamp assembly for a vehicle, wherein the vehicle has two side plates and a tailgate, the tailgate configurable at an opened position or a closed position with respect to the two side plates, the tail lamp assembly comprising:
   a tail lamp, embedded in one of the side plates and comprising a first lamp set, a solenoid valve and a signal module, the first lamp set electrically controlled by the vehicle to selectively provide at least one first warning signal, the signal module controlled by the vehicle to generate at least one control signal in accordance with the first warning signal; and
   a tailgate lamp, attached to the tailgate and comprising a receiving module, the tailgate lamp and the receiving module respectively made adjacent to the tail lamp and the signal module when the tailgate is configured at the closed position, the solenoid valve being controlled and activated by the vehicle to establish an electrical signal channel between the signal module and the receiving module when the tailgate is configured at the closed position, the tailgate lamp adapted to receive the at least one control signal through the electrical signal channel and provide at least one second warning signal in accordance with the first warning signal provided by the tail lamp.

2. The tail lamp assembly of claim 1, wherein the tailgate lamp is attached to a plain surface of the tailgate via adhering or bolting.

3. The tail lamp assembly of claim 1, wherein the tailgate lamp stops receiving the at least one control signal through the electrical signal channel when the tailgate is configured at the opened position.

4. The tail lamp assembly of claim 1, wherein the receiving module is adapted to receive the at least one control signal through the electrical signal channel and the tailgate lamp comprises a second lamp set adapted to provide the corresponding at least one second warning signal.

5. The tail lamp assembly of claim 1, wherein the solenoid valve is controlled and activated by the vehicle to establish an electrical power channel between the signal module and the receiving module when the tailgate is configured at the closed position.

6. The tail lamp assembly of claim 1, wherein the tailgate lamp is adjacent to the tail lamp and the tailgate lamp together with the tail lamp form a shape with continuous contour.

7. The tail lamp assembly of claim 1, wherein the first lamp set comprises at least one of an indicator, a warning light, and a stop light, and the tailgate lamp comprises at least one of an indicator, a warning light, and a stop light.

8. A tail lamp assembly for a pickup truck, wherein the pickup truck has an open and uncovered loading space formed and surrounded by two side plates, a tailgate, and a base plate of the pickup truck, the tailgate pivoted to the base plate and configurable at an opened position or a closed position with respect to the two side plates, the tail lamp assembly comprising:

a tail lamp, embedded in one of the side plates and comprising a first lamp set, a solenoid valve and a signal module, the first lamp set electrically controlled by the pickup truck to selectively provide at least one first warning signal, the signal module controlled by the pickup truck to generate at least one control signal in accordance with the first warning signal; and a tailgate lamp, attached to the tailgate and comprising a receiving module, the tailgate lamp and the receiving module respectively made adjacent to the tail lamp and the signal module when the tailgate is configured at the closed position, the solenoid valve being controlled and activated by the vehicle to establish an electrical signal channel between the signal module and the receiving module when the tailgate is configured at the closed position, the tailgate lamp adapted to receive the at least one control signal through the electrical signal channel and provide at least one second warning signal in accordance with the first warning signal provided by the tail lamp.

9. The tail lamp assembly of claim 8, wherein the tailgate lamp is attached to a plain surface of the tailgate via adhering or bolting.

10. The tail lamp assembly of claim 8, wherein the tailgate lamp stops receiving the at least one control signal through the electrical signal channel when the tailgate is configured at the opened position.

11. The tail lamp assembly of claim 8, wherein the receiving module is adapted to receive the at least one control signal through the electrical signal channel and the tailgate lamp comprises a second lamp set adapted to provide the corresponding at least one second warning signal.

12. The tail lamp assembly of claim 8, wherein the solenoid valve is controlled and activated by the pickup truck to establish an electrical power channel between the signal module and the receiving module when the tailgate is configured at the closed position.

13. The tail lamp assembly of claim 8, wherein the signal module and the receiving module cooperatively form in a shape where a hand may grip on the pickup truck.

14. The tail lamp assembly of claim 8, wherein the tailgate lamp is adjacent to the tail lamp and the tailgate lamp together with the tail lamp form a shape with continuous contour.

15. The tail lamp assembly of claim 8, wherein the first lamp set comprises at least one of an indicator, a warning light, and a stop light, and the tailgate lamp comprises at least one of an indicator, a warning light, and a stop light.

16. A tail lamp assembly for a vehicle, wherein the vehicle has two side plates and a tailgate, the tailgate configurable at an opened position or a closed position with respect to the two side plates, the tail lamp assembly comprising:

a tail lamp, embedded in one of the side plates and comprising a first lamp set and a signal module, the first lamp set electrically controlled by the vehicle to selectively provide at least one first warning signal, the signal module controlled by the vehicle to generate at least one control signal in accordance with the first warning signal; and a tailgate lamp, attached to the tailgate and comprising a receiving module, the tailgate lamp and the receiving module respectively made adjacent to the tail lamp and the signal module when the tailgate is configured at the closed position, an electrical signal channel being established by the signal module magnetically coupled to the receiving module when the tailgate is configured at the closed position, the tailgate lamp adapted to receive the at least one control signal through the electrical signal channel and provide at least one second warning signal in accordance with the first warning signal provided by the tail lamp.

17. The tail lamp assembly of claim 16, wherein the tailgate lamp is attached to a plain surface of the tailgate via adhering or bolting.

18. The tail lamp assembly of claim 16, wherein the tailgate lamp stops receiving the at least one control signal through the electrical signal channel when the tailgate is configured at the opened position.

19. The tail lamp assembly of claim 16, wherein the receiving module is adapted to receive the at least one control signal through the electrical signal channel, and the tailgate lamp comprises a second lamp set adapted to provide the corresponding at least one second warning signal.

20. The tail lamp assembly of claim 16, wherein an electrical power channel is established by the signal module magnetically coupled to the receiving module when the tailgate is configured at the closed position.

21. The tail lamp assembly of claim 16, wherein the tailgate lamp is adjacent to the tail lamp and the tailgate lamp together with the tail lamp form a shape with continuous contour.

22. The tail lamp assembly of claim 16, wherein the first lamp set comprises at least one of an indicator, a warning light, and a stop light, and the tailgate lamp comprises at least one of an indicator, a warning light, and a stop light.

\* \* \* \* \*